United States Patent
Kulekci

(10) Patent No.: US 10,554,389 B2
(45) Date of Patent: Feb. 4, 2020

(54) EFFICIENT ENCRYPTION METHOD TO SECURE DATA WITH REDUCED NUMBER OF ENCRYPTION OPERATIONS

(71) Applicant: ISTANBUL TEKNIK UNIVERSITESI, Istanbul (TR)

(72) Inventor: M. Oguzhan Kulekci, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 59 days.

(21) Appl. No.: 15/779,853

(22) PCT Filed: Nov. 14, 2016

(86) PCT No.: PCT/TR2016/050441
§ 371 (c)(1),
(2) Date: May 30, 2018

(87) PCT Pub. No.: WO2018/088975
PCT Pub. Date: May 17, 2018

(65) Prior Publication Data
US 2018/0351730 A1     Dec. 6, 2018

(51) Int. Cl.
*H04L 9/06* (2006.01)
*G09C 1/00* (2006.01)
(Continued)

(52) U.S. Cl.
CPC ............ *H04L 9/065* (2013.01); *G09C 1/00* (2013.01); *H03M 7/4037* (2013.01); *H04L 9/00* (2013.01);
(Continued)

(58) Field of Classification Search
CPC . H04L 9/065; H04L 2209/30; H04L 2209/34; H04L 9/00; H03M 7/4037; G09C 1/0034
(Continued)

(56) References Cited

U.S. PATENT DOCUMENTS

| 5,805,700 A * | 9/1998 | Nardone | H04N 7/1675 348/425.3 |
| 7,039,938 B2 * | 5/2006 | Candelore | H04N 21/2347 380/211 |
| 7,199,735 B1 * | 4/2007 | Wen | H03M 7/4006 341/107 |

(Continued)

FOREIGN PATENT DOCUMENTS

WO    WO-2018088975 A1 *  5/2018  ............... G09C 1/00

OTHER PUBLICATIONS

Ferragina et al., A simple storage scheme for strings achieving entropy bounds, Theoretical Computer Science, Feb. 15, 2007, pp. 115-121, vol. 372, No. 1.
(Continued)

*Primary Examiner* — David J Pearson
*Assistant Examiner* — Badri Narayanan Champakesan
(74) *Attorney, Agent, or Firm* — Gokalp Bayramoglu

(57) ABSTRACT

The invention is particularly related with an encryption method that aims to secure an input data with reduced number of encryption operations. The invention claim the security by using the hardness of the unique decodability of the variable-length non-prefix-free (NPF) codes. The proposed encryption system is operated according to these steps, compression of the input data and coding with the introduced NPF encoding that splits the independent and identically distributed (IID) data to the two stream as code-word boundaries information data, which has all information of boundaries of NPF code words stream, and NPF code words stream which has all payload of encoded IID data except code-word boundaries information and then encrypting the code-word boundaries information without NPF code words stream.

2 Claims, 2 Drawing Sheets

(51) Int. Cl.
   *H04L 9/00* (2006.01)
   *H03M 7/40* (2006.01)
(52) U.S. Cl.
   CPC ...... *H04L 2209/30* (2013.01); *H04L 2209/34* (2013.01)
(58) Field of Classification Search
   USPC .......................................................... 380/28
   See application file for complete search history.

(56) References Cited

U.S. PATENT DOCUMENTS

| | | | |
|---|---|---|---|
| 7,426,636 B1* | 9/2008 | McGrew | H04L 63/0272 713/160 |
| 2004/0193871 A1* | 9/2004 | Seshadri | H04L 63/0428 713/154 |
| 2005/0141713 A1* | 6/2005 | Genevois | H04L 63/0428 380/239 |
| 2007/0083467 A1* | 4/2007 | Lindahl | G11B 20/00086 705/50 |
| 2007/0110225 A1* | 5/2007 | Leventhal | H04L 9/0618 380/28 |
| 2007/0263876 A1* | 11/2007 | De Waal | H04L 9/00 380/286 |
| 2008/0065903 A1* | 3/2008 | Goodman | G06F 21/6218 713/193 |
| 2012/0134496 A1* | 5/2012 | Farkash | H04N 7/167 380/210 |
| 2013/0054850 A1* | 2/2013 | Co | H04L 12/4633 710/105 |
| 2013/0330013 A1* | 12/2013 | Singh | H03M 7/40 382/234 |
| 2014/0210652 A1* | 7/2014 | Bartnik | H03M 7/40 341/67 |
| 2016/0124867 A1* | 5/2016 | Oportus Valenzuela | G06F 12/12 711/159 |
| 2016/0124983 A1* | 5/2016 | Kelly | G06F 7/582 707/693 |
| 2019/0007681 A1* | 1/2019 | Tsai | H04N 19/119 |

OTHER PUBLICATIONS

Marco Dalai et al., Non prefix-free codes for constrained sequences, Arixv.org, Jun. 10, 2005.

* cited by examiner

EFFICIENT ENCRYPTION METHOD TO SECURE DATA WITH REDUCED NUMBER OF ENCRYPTION OPERATIONS

CROSS REFERENCE TO RELATED APPLICATIONS

This application is the national phase entry of International Application No. PCT/TR2016/050441, filed on Nov. 14, 2016, the entire contents of which are incorporated herein by reference.

TECHNICAL FIELD

The invention is related with encryption method, which reduces the amount of required encryption operations.

The invention is particularly related with an encryption method, which claim the security by using the hardness of the unique decodability of the variable-length non-prefix-free (NPF) codes.

BACKGROUND

In terms of computational load, the encryption operations are heavy duties occupying significant CPU time, and thus, they are serious power consumers. Reducing this load is especially important in battery-constrained computational environments with limited processing capacities such as the sensor networks, unmanned aerial vehicles, mobile video transmission, and etc.

When data volume is huge such as the case in video transmission, encryption of the whole data introduces a heavy computational load, and also a serious power consumption in parallel. Thus, methods to reduce this load have attained significant attention. There are some developments present in the known state of the art that aim to reduce the amount of encryption operations while securing data. The main approach in those studies is selective (or partial) encryption of the data. In selective encryption some selected parts that are assumed to be important information content of the data are encrypted, and the rest of the data is transmitted/stored in plain format.

The daily practice in securing data is to first compress the data and then encrypt it with an encryption scheme that is assumed to be secure. In that sense perform the compression and encryption steps together has also been considered. However, notice that, in that approach the number of encryption operations are not reduced, but the main point is to achieve the compression and encryption in a single step to gain from elapsed time. We provide some of the exemplary patents regarding to both combined compression and encryption as well as the partial (selective) encryption.

For example in the US2016124983A1 patent document which can be given as an example to these developments, secure compression algorithms are provided that may be employed as a single operation on raw data to produce compressed and encrypted data. In embodiments, the algorithms described herein may be performed using any type of dictionary based encryption. In one embodiment, upon adding a new prefix to a dictionary table, the dictionary table may be permuted to randomize the entries into the table. The randomization may be based upon a permutation value generated by a deterministic pseudo-random generator and/or pseudo-random function. Other embodiments of randomization may be employed to provide secure compression.

In the paper titled "A simple storage scheme for strings achieving entropy bounds" (FERRAGINA et all, Theoretical Computer SCI, Amsterdam, Vol. 372) a non prefix free code where the sequence of code words is separated from the information of the starting position of each code words is disclosed.

In the American Patent document numbered US20120134496 a method of partial encryption wherein a server receiving a sequence of image frames comprises the image frames into blocks of variable size and parameters representing inter frames including block sizes, is disclosed.

In the American Patent document numbered US2007083467A1 within the known state of the art, the invention pertains to improved techniques to partially encrypt media files. The encryption serves to cryptographically secure only a portion of the media data within a media file, while the remaining portion of the media data is not cryptographically secured. Although only partial encryption is used, the portion being encrypted serves to substantially disrupt usefulness of other parts of the media file which are not encrypted. In other words, the partial encryption renders the media file substantially unusable by unauthorized users.

In the American Patent document numbered US2007110225A1 within the known state of the art, methods and devices are provided for accelerating the throughput and or reducing the power consumption of symmetric cryptography algorithms. Certain computations of a symmetric encryption or decryption algorithm are performed during a first phase, the results are saved to memory, and the results are retrieved to encode data during a second phase. If the first phase is implemented while the battery is being charged and the second phase is implemented while the system runs on battery power, the battery life is significantly extended compared to the battery life when all phases are implemented using solely battery power.

In the American Patent document numbered US2004193871A1 within the known state of the art, particular portions of a message receive strong encryption while other parts of the message are less strongly encrypted or even unencrypted, resulting in a differentially encrypted data set. The data set is transmitted to a receiving end where it may be decrypted as desired. Receiving stations requiring the encrypted information and having authorized access may decrypt it, while other stations may decrypt this information only partially or not at all. Required computational power is reduced both on the client side and in channel processing because only selected portions of the message are subject to strong encryption and decryption processing, and latency and problems associated with latency are reduced.

In the American Patent document numbered US2007263876A1 within the known state of the art, methods and devices related to compression and encryption of data. Data to be encrypted and compressed is first received and then stored in physical memory. Once stored in a data structure in physical memory, the data is streamed to a process which compresses the data. The compressed data is then streamed, from the physical memory, to an encryption process. The compressed and encrypted data can then be transmitted. To decrypt and decompress, the compressed and encrypted data is first read into another data structure that stores the data into physical memory. The data is then streamed from the physical memory to, in turn, a decryption process and then a decompression process.

There are lots of patents based on selective (partial) encryption especially targeting the multimedia data transmission and storage also, such as US20050141713A1 Selective multimedia data encryption (SCM microsystems), US US20080065903A1 Selective encryption of data stored on removable media in an automated data storage library (IBM), U.S. Pat. No. 7,039,938B2 Selective Encryption for video-on-demand, U.S. Pat. No. 5,805,700A Policy based selective encryption of compressed video data (Intel), and many more.

It had been previously shown that symetric security algorithms roughly doubles the energy consumption of normal operation in those environments, and asymetric security algorithms increase the energy usage per bit in orders of magnitudes. Providing the data security in such platforms is becoming more and more important considering their wide-spread in the fast approaching era of the internet of things (IoT), where privacy will be a necessity rather than a preference.

As it can be understood from the similar mentioned documents above different methods are being used in order to develop an encryption method to be applied on compressed data. The difference of the proposed study from selective (partial) encryption is that the proposed invention provides the security of the full data, where in selective encryption only the selected sections of the data are secured. The reduction in the amount of encryption improves on larger files with the proposed technique, where around 10 percent encryption of the data becomes sufficient. In selective encryption the ratio is fixed regardless of the size of the data. When compared to combined encryption/compression schemes, those schemes do not aim to reduce the encryption operations but to reduce the time required for the total operations, and thus, not very much related with the aim of this invention.

SUMMARY

The aim of this invention is to provide a method for data encryption which reduces the amount of required encryption operations.

The data encryption method provided in order to reach the aims of the invention comprises the code-word boundaries which is absolutely necessary for correct decoding.

In the proposed data encryption method, process is applied on randomly distributed input data, which is obtained by applying a compression algorithm on the input data when the data itself is not assumed to be independent and identically distributed. When the data itself reflects a random distribution, then the compression step can be skipped and the proposed method can directly be applied on the input data. From now on, we will refer to the compressed input data or the input data that is already i.i.d without compression as IID data and the proposed NPF coding scheme will be applied on that IID data.

The proposed invention makes it possible to secure the IID data with up to 90% less encryption. The gain in the encryption amount with the proposed technique is based on a parameter d, that specifies the block-size in bits, which is selected according to the size of the compressed data. The block-size parameter d is selected such that $n \geq d.2^d$, where n is the number of bits in the IID data. Thus, larger the n value, it becomes feasible to select larger d values. With larger d values the code-word boundary information becomes smaller in volume, and since we are only encrypting it for the security, the gain in encryption improves.

BRIEF DESCRIPTION OF THE DRAWINGS

The data encryption method that is provided in order to reach the aims of the invention has been illustrated in the attached figures. According to the figures.

Figure 1:
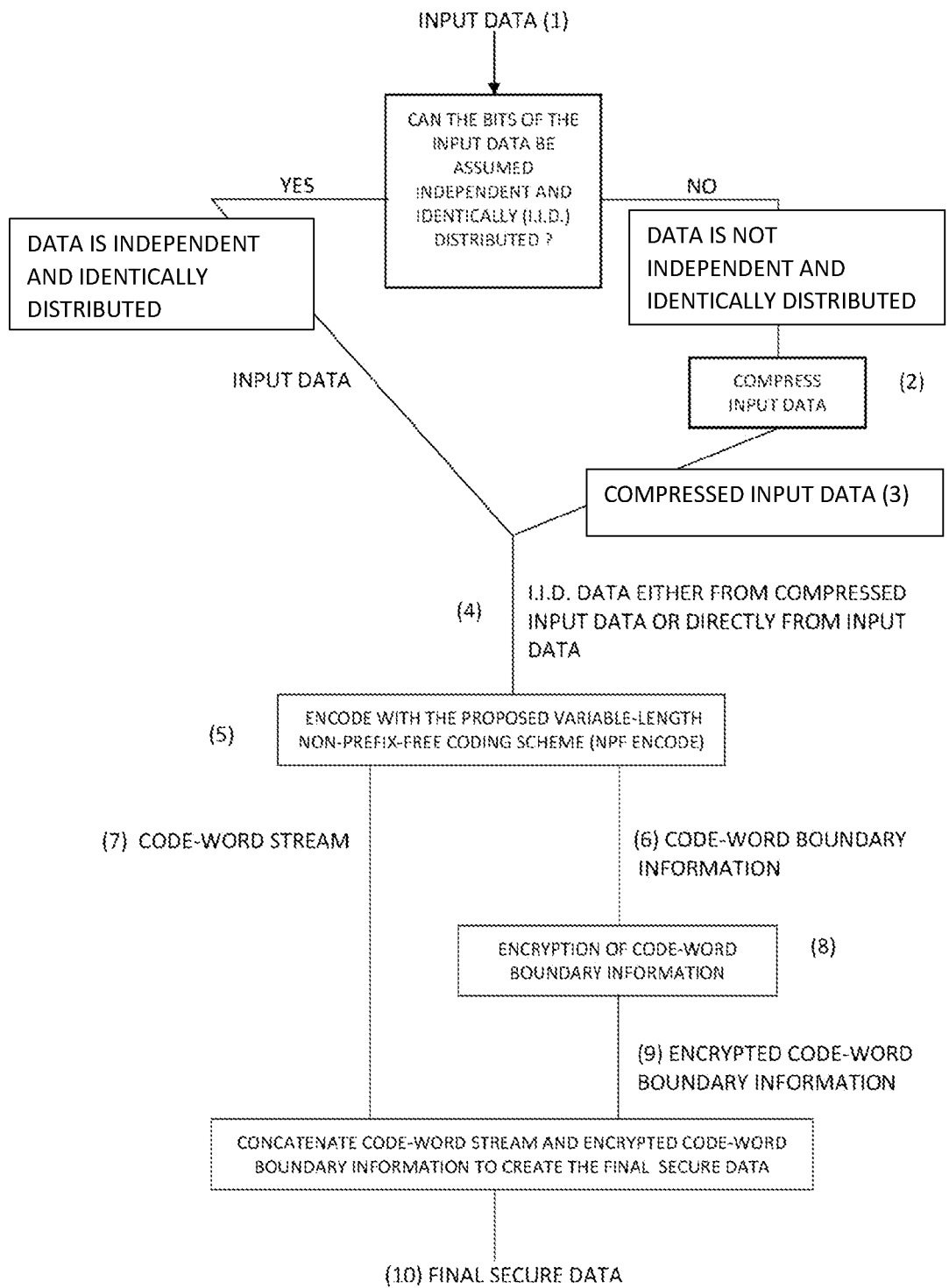
FIG. 1 is the general sketch view of data encryption method.
Figure 2:
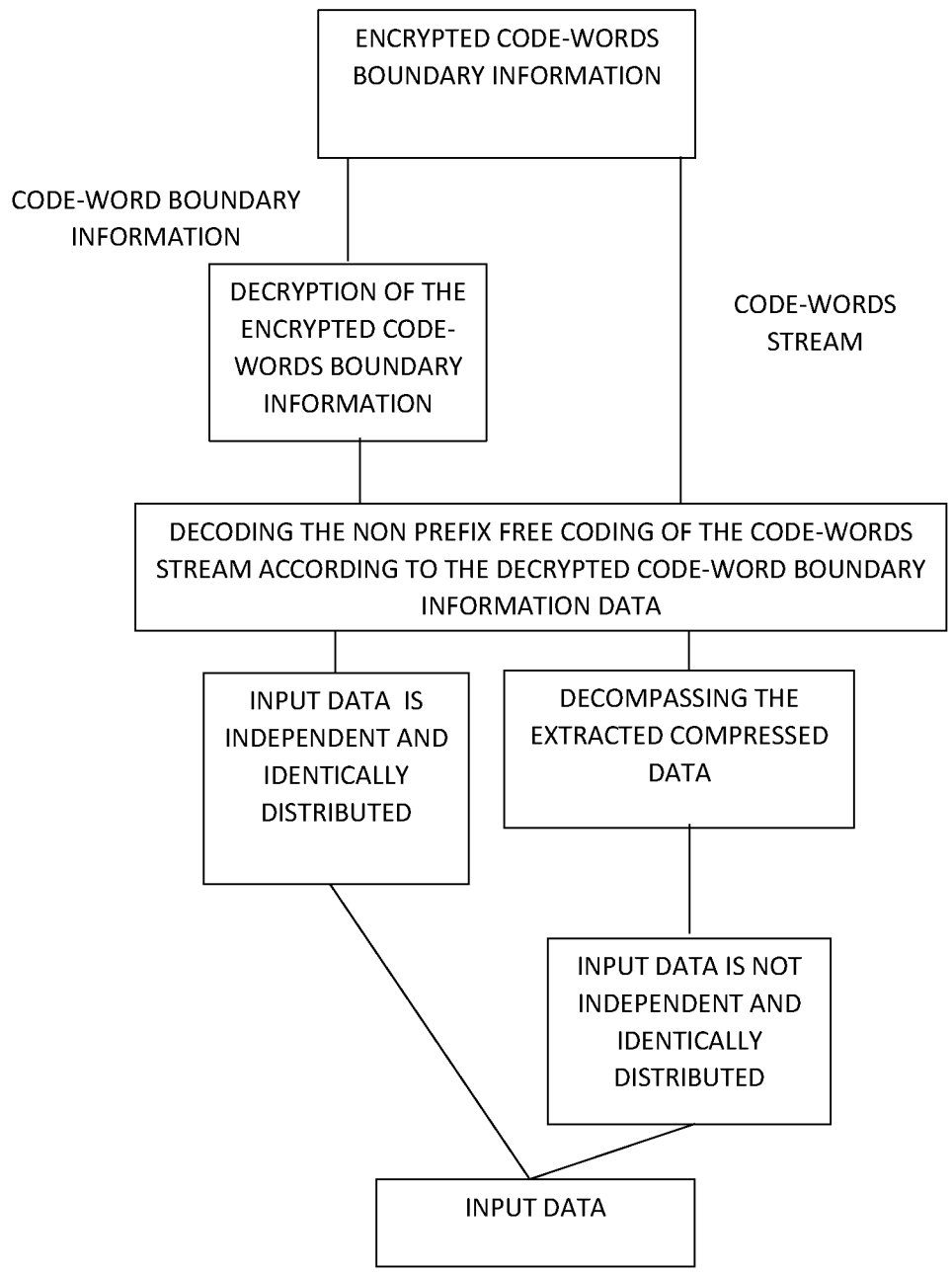
FIG. 2 is the general sketch view of data decryption method.

The parts in the figures have been numbered as follows;
11. Input Data
12. Compression
13. Compressed data
14. IID data
15. NPF encoding
16. Code-word boundaries information
17. Code-word stream
18. Encryption
19. Encrypted code-word boundary information
20. Secured data

DETAILED DESCRIPTION OF THE EMBODIMENTS

The proposed technique processes the n bits long IID data (4) in d-bits long blocks, and replaces every d-bits long block by its corresponding variable-length non-prefix-free code-word generated according to the introduced new coding scheme. The IID data (4) is obtained from input data (1) by compressing (2) it. When input data (1) can be assumed to be independently and identically distributed, the IID data (4) is directly the input data (1) itself omitting the compression (2) step.

A typical block length parameter d is selected such that $n \geq d.2^d$. The IID data (4) is encoded with the introduced method of variable-length non-prefix-free coding scheme (NPF) (5). The NPF encoding (5) step creates two streams of data. The first stream of is the code-word stream (7), where each fixed d-bits long block of the IID data (4) is NPF encoded (5) with a code-word of varying bit-length. The second stream is the code-word boundary information (6) that specifies the lengths of each code-word in the code-word stream (7).

The NPF code-words set is generated without the prefix-free restriction so that a code-word may be a prefix of another. Thus, non-prefix-free (NPF) code words stream (7) is ambiguous and cannot be decoded without the knowledge of the code-word boundaries information (6). The lack of unique decodability without the code-word boundaries information (6) in NPF encoding (5) provides a unique opportunity in terms of security. Therefore, encrypting (8) the code-word boundary information (6) with an appropriate encryption algorithm is sufficient to provide the security of the input data (1).

The code-words stream (7) is kept intact as it cannot be decoded without the code-word boundary information (6), that is already encrypted (8).

Generally, the security of a system depends on the hardness of solving a mathematical question such as the discrete logarithm or the factorization problems. In this invention it is made use of the hardness of decoding a sequence NPF encoded (5) with variable-length non-prefix-free codes in case the knowledge of the code-word boundaries information (6) is missing. The hardness of cipher-text only attacks on non-prefix-free codes and even on prefix codes had been previously studied in the literature (CITATIONs from the paper).

To examine in detail, $A = a_1 a_2 \ldots a_n$ is an independently and identically distributed (i.i.d) random bit sequence (4), and d>1 is an integer indicating a bit block length. Without loss of generality, it is assumed n is divisible by d as it is always possible to pad the A with necessary number of randomly generated bits if this is not the case.

The number of d-bits long blocks in A is r=n/d and A can be represented as $B=b_1 b_2 \ldots b_r$, where each d-bits long $b_i$ in B, for $1 \le I \le r$, is drawn from the alphabet $\Sigma=\{0, 1, 2, \ldots 2^d--1\}$. For instance, when d=3, the alphabet becomes $\Sigma=\{000,001,010,011,100,101,110,111\}$, and $|\Sigma|=2^d=8$. Since A has been assumed to be an i.i.d random bit sequence, B can also be assumed i.i.d. over $\Sigma$ for reasonable d values selected according to the size of A.

Definition 1.

The minimum binary representation (MBR) of an integer $i \ge 2$ is its binary representation without the leftmost 1 bit.

As an example, the minimum binary representation of 21 is MBR (21)=0101 by omitting the leftmost set bit in its binary representation as $21=(10101)_2$.

Definition 2.

Let $\Sigma''=\{\epsilon_1, \epsilon_2, \ldots, \epsilon_z\}$ for $z=2^d$ be a random permutation of the alphabet $\Sigma=\{0, 1, 2, \ldots, 2^d-1\}$, and $W=\{w_1, w_2, w_z\}$ is a code-word set such that $$w_i = \begin{cases} MBR(2 + \epsilon_i), & \text{if } \epsilon_i < 2^d - 2 \\ \{MBR(2^d + \delta): \forall \delta \in \{0, 1, \ldots, 2^d - 1\}, \\ \text{where } \delta = \{0, 3\} \bmod 4, & \text{if } \epsilon_i < 2^d - 2 \\ \{MBR(2^d + \delta): \forall \delta \in \{0, 1, \ldots, 2^d - 1\}, \\ \text{where } \delta = \{1, 2\} \bmod 4, & \text{if } \epsilon_i < 2^d - 1 \end{cases}$$

Assuming an input sequence $B=b_1 b_2 \ldots b_r$, where $0 \le b_i \ge 2^d$ d for all $1 \le i \le r$, the non-prefix-free encoding (4) of B is denoted by N P F $(B)=w_{1+b_1} w_{1+b_2} \ldots w_{1+b_r}$, that is generated by concatenating the code-words determined by each $b_i$ in order. When a code-word has multiple options, which is the case for $\epsilon_i \ge 2^d - 2$, a random code-word among the possibilities is selected.

The NPF encoding (4) of a sample sequence according to the Definitions 1 and 2 with the parameter d=3 is shown in Scheme 2. The code-words $w_1$ and $w_5$ are sets due to the corresponding values of $\epsilon_i=6=2^3-2$ and $\epsilon_5=7=2^3-1$. Thus, when $b_i=4$ or $b_i=0$, a randomly selected code-word respectively from sets $w_5$ or $w_1$, is inserted into the NPF (B) stream. At a first glance, using multiple code-words as an exception for the two $\epsilon_i \ge 2^d - 2$ values might seem a bit strange. The reason for that is to avoid a possible statistical attack.

Proposition 1.

In a code-word set W that is generated for a block length d>1 according to Definition 2, the bit-lengths of the code-words are in $\{1, 2, \ldots, d\}$. The number of l-bits long code-words for each $l \in \{1, 2, \ldots, d-1\}$ is $2^l$, and there exist 2 sets of code-words for l=d each of which includes $2^{d-1}$ code-words.

Scheme. 2.

A simple sketch of the non-prefix-free encoding (4) of an input data (1) bit sequence. A is the input data (1), where B is the representation of A by assuming the block length d=3. $\Sigma'$ is a randomly selected permutation of the corresponding alphabet $\Sigma$, and W is the non-prefix-free code-word set generated for $\Sigma'$ according to Definition 2.

Proof.

According to Definition 2, the entities in W are minimum binary representations of numbers $\{2, 3, \ldots, 2^{d+1}-1\}$. Since the MBR bit-lengths of those numbers range from 1 to d, there are d distinct code-word lengths in W. Each code-word length $l \in \{1, 2, \ldots, d-1\}$ defines $2^l$ distinct code-words, and thus, total number of code-words defined by all possible l values becomes $$\Sigma_{i=1}^{d-1} 2^i = 2^d - 2$$

The remaining 2 code-words out of the $|W|=2^d$ items require d-bits long bit sequences. For example, when d=3, the $|W|$ includes $2(=2^1)$ code-words of 1-bit long, $4(=2^2)$ code-words of length 2, and $2(=2^3-6)$ code-word sets of length 3-bits as shown in Scheme 2.

Lemma 1.

Assuming $B=b_1 b_2 \ldots b_r$ denotes an input sequence, where d-bits long bi values for $1 \le i \le r$ and d>1 are independent and identically distributed over $\{0, 1, 2, \ldots, 2^d-1\}$, the total bit length of the non-prefix-free code-words encoding the B sequence is $$|NPF(\mathcal{B})| = r \cdot \left[ d - 2 + \frac{(d+1)}{2^{d-1}} \right]$$

Proof.

Since B is i.i.d., each value from set $\{0, 1, 2, \ldots, 2^d-1\}$ appears $r/(2^d)$ times in B. As stated in Proposition 1, the code-word lengths for NPF encoding (4) in W vary from 1 to d such that there are $2^l$ code-words for each $l \in \{1, 2, \ldots, d-1\}$, and l=d bits long code-words are included in 2 separately maintained sets. The number of $b_i$ values that are represented by each $l \in \{1, 2, \ldots, d-1\}$ bits in NPF(B) is $(2^l \cdot (r/(2^d)))$ and thus their contribution to $|NPF(B)|$ is $(l.2^l \cdot (r/(2^d)))$ bits. Since there are 2 code-word set options for length l=d, they produce $(d.2.(r/(2^d)))$ bits in NPF (B). Summing these up gives the total length of the NPF code-stream as:

$$|NPF(\mathcal{B})| = \frac{r}{2^d}(1.2 + 2.2^2 + \ldots + (d-1) \cdot 2^{d-1} + d \cdot 2)$$

$$= \frac{r}{2^d}\left(2 \cdot d + \sum_{i=1}^{d-1} i \cdot 2^i\right)$$

| $\Sigma =$ | 0 | 1 | 2 | 3 | 4 | 5 | 6 | 7 |
|---|---|---|---|---|---|---|---|---|
| $\Sigma' =$ | 6 | 0 | 5 | 1 | 7 | 2 | 4 | 3 |
| = | $\epsilon_1$ | $\epsilon_2$ | $\epsilon_3$ | $\epsilon_4$ | $\epsilon_5$ | $\epsilon_6$ | $\epsilon_7$ | $\epsilon_8$ |
| W = | {000, 011, 100, 111} | 0 | 11 | 1 | {001, 010, 101, 110} | 00 | 10 | 01 |
| = | $w_1$ | $w_2$ | $w_3$ | $w_4$ | $w_5$ | $w_6$ | $w_7$ | $w_8$ |
| A = | 001 | 110 | 101 | 011 | 010 | 111 | 100 | 000 |
| B = | 1 | 6 | 5 | 3 | 2 | 7 | 4 | 0 |
| NPF (B) = | $w_2$ | $w_7$ | $w_6$ | $w_4$ | $w_3$ | $w_8$ | $w_5$ | $w_1$ |
| = | 0 | 10 | 00 | 1 | 11 | 01 | 001 | 000 |

-continued $$= \frac{r}{2^d}(2 \cdot d + 2^d \cdot (d-2) + 2)$$

$$= r \cdot \left[d - 2 + \frac{(d+1)}{2^{d-1}}\right]$$

While computing the summation term in $$\frac{r}{2^d}\left(2 \cdot d + \sum_{i=1}^{d-1} i \cdot 2^i\right),$$

it is used the formula from basic algebra that
$\Sigma_{i=1}^p i.2^i = 2^{p+1}(p-1)+2$
and substitute p=d−1.

The input sequence B is originally r.d bits long, and the NPF encoding (5) reduces that space to $$r \cdot \left[d - 2 + \frac{(d+1)}{2^{d-1}}\right] \text{ as } \left[\frac{(d-1)}{2^{d-1}}\right] < 2 \text{ for all } d > 1.$$

However, since non-prefix-free codes are not uniquely decodable, NPF (B) cannot be converted back to the original B sequence in absence of the code-word boundaries information (6) on NPF (B). Thus, it is rigidly necessary that representing the code-word boundaries information (6) positions on NPF (B) for proper decoding. Lemma 2 states an efficient method to achieve this task.

Lemma 2.

Let B=$b_1 b_2 \ldots b_r$ denotes an input sequence such that the $b_i$ values are i.i.d. over $\{0, 1, 2, \ldots, 2^d-1\}$. The number of bits required to represent the code-word boundaries information (6) in the NPF (B) is $$r \cdot \left[2 - \frac{1}{2^{d-2}}\right]$$

Proof.

There exists $2^l$ code-words for each code-word length $l \in \{1, 2, \ldots, d-1\}$, and each code-word is substituted in place of $r/2^d$ items in B=$b_1 b_2 \ldots b_r$ during the NPF encoding (5) of the B. For l=d−1, the number of code-words with that length is $$2^{d-1} \cdot \frac{r}{2^d} = \frac{r}{2}$$

and similarly, when l=d−2, there appears $$2^{d-2} \cdot \frac{r}{2^d} = \frac{r}{4}$$

code-words having length d−2. As a generalization, for l=d−2 where i=$\{1, 2, \ldots, d-1\}$, there are $$2^{d-i} \cdot \frac{r}{2^d} = \frac{r}{2^i}$$

code-words with length l on NPF (B). It is maintained (d−1) bitmaps denoted by $D_1, D_2, D_{d-1}$ such that $D_i$ is dedicated to the specific code-word length l=d−i for i=1 to i=d−1. The bit sequence $D_i$ is of $$\frac{r}{2^{i-1}}$$

bits long, in which the positions that correspond to (d−i)-bits long code-words are marked with 1, and rest to 0.

For instance, on the first level bitmap $D_1$ the positions of code-words with length l=d−1 are specified by 1, and rest with 0. $D_1$ contains r bits, and the number of zero and one bits are equal since there are $$2^{d-1} \cdot \frac{r}{2^d} = \frac{r}{2}$$

items whose NPF code length is l=d−1. The second bitmap $D_2$ is r/2 bits long that are reserved for the items represented by 0 in $D_1$. In $D_2$, the positions whose length l=d−2 are set to 1, and rest to 0. Same process is repeated on all bitmaps. The last bitmap $D_{d-i}$ becomes $$\frac{r}{2^{d-2}}$$

bits long, on which the code-words of lengths l=1 and l=d are marked with 1 and 0 bits, respectively. The total number of bits in these (d−1) bitmaps can be computed with $$r \cdot \left(1 + \frac{1}{2} + \frac{1}{4} + \ldots + \frac{1}{2^{d-2}}\right) = r \cdot \sum_{i=0}^{d-2} \frac{1}{2^i} = r \cdot \left[2 - \frac{1}{2^{d-2}}\right]$$

| NPF (B) = | 0 | 10 | 00 | 1 | 11 | 01 | 001 | 000 |
|---|---|---|---|---|---|---|---|---|
| Code - word lengths = | 1 | 2 | 2 | 1 | 2 | 2 | 3 | 3 |
| $D_1$ = | 0 | 1 | 1 | 0 | 1 | 1 | 0 | 0 |
| $D_2$ = | | 1 | 0 | | 1 | | 0 | 0 |

Scheme 3.

Marking the code-word boundaries information (5) on the sample NPF (B) via the proposed method. The 2-bits long code-words are marked on the first bitmap D1 by 1 bits. The lengths for those that are represented by 0 on D1 are specified on the second bitmap D2, on which 1- and 3-bits long code-words represented, respectively, by 1 and 0 bits.

Scheme 2 depicts the proposed method to mark the code-word boundaries information (6) on the sample NPF (B) introduced in Scheme 2 Since d=3 in that sample, there are d−1=2 bitmaps. On the first bitmap $D_1$ that is r=8 bits long, the positions represented with 1 bits indicate that the corresponding code-words that are d−1=2 bits long. The second bitmap $D_2$ is r/2=4 bits long, on which the positions with bit 1 mark the (d−2)=1 bit long code-words, and the positions with 0 bit indicate the d=3 bits long code-words. In total $$|D_1| + |D_2| = 8 \cdot \left[2 + \frac{1}{2^{3-2}}\right] = 12$$

bits are used.

Theorem 1.

Let $B = b_1 b_2 \ldots b_r$ be an input sequence, where the bi values, for $1 \leq i \leq r$, are i.i.d. over $\Sigma = \{0,1,2, \ldots 2^d-1\}$, and represented by d-bits. The total bit length of the NPF encoding (4) of the sequence 13 with the code-word boundaries information (5) specification information is:

$$r \cdot \left[d + \frac{(d-1)}{2^{d-1}}\right]$$

Proof.

Sum of the space consumption described in Lemmas 1 and 2 returns this.

$$r \cdot \left[d - 2 + \frac{(d+1)}{2^{d-1}}\right] + r \cdot \left[2 - \frac{1}{2^{d-2}}\right] = r \cdot \left[d + \frac{(d-1)}{2^{d-1}}\right]$$

The NPF encoding (5) of the input sequence 13, which is originally $r \cdot d$ bits long, introduces an overhead that requires $$r \cdot \left[\frac{(d-1)}{2^{d-1}}\right],$$

more bits as seen on Theorem 1. The number of extra bits per each original bit in B can be computed with $$\left[\frac{r \cdot \frac{(d-1)}{2^{d-1}}}{r \cdot d}\right] = \left[\frac{(d-1)}{d \cdot 2^{d-1}}\right]$$

TABLE 1

The overhead $\left[\frac{(d-1)}{d \cdot 2^{d-1}}\right]$ bits per each original bit introduced by the proposed NPF encoding (4) for some selected d values. Notice that the overhead becomes negligible with increasing d values.

| d = | 2 | 4 | 8 | 16 | 20 | 24 | 32 |
|---|---|---|---|---|---|---|---|
| $\frac{(d-1)}{d \cdot 2^{d-1}} \approx$ | 0.25 | 0.125 | $6.8 \cdot 10^{-3}$ | $2.8 \cdot 10^{-5}$ | $1.8 \cdot 10^{-6}$ | $1.1 \cdot 10^{-7}$ | $4.5 \cdot 10^{-10}$ |

Table 1 summarizes the amount of extra bits introduced by the proposed NPF encoding (5) per each original bit IID data (4). Thanks to the exponentially increasing denominator ($2^{d-1}$) in the denominator of the equation $$\left[\frac{r \cdot \frac{(d-1)}{2^{d-1}}}{r \cdot d}\right] = \left[\frac{(d-1)}{d \cdot 2^{d-1}}\right]$$

that the extra space consumption quickly becomes very small, and even negligible with larger d values. When d=8, the proposed NPF encoding (5) method produces only 6.8 extra bits per a thousand bit. Similarly, the overhead becomes less than 3 bits per 100K bits, and less than 2 bits per a million bit for the values of d=16 and d=20, respectively. Thus, while selecting d, one needs to choose a high d value not to spend more space, where as a minimum d=8 seems to be useful in practical applications.

What is claimed is:

1. An encryption method, comprising compression of input data before all encoding operations, wherein the method further comprises the following steps:
   encoding with non-prefix free encoding operation of compressed input data;
   splitting the encoded compressed input data to two streams as code-word boundaries information data which has all information of boundaries of non-prefix free code words stream, and non-prefix free code words stream which has all payload of the encoded compressed input data except the code-word boundaries information;
   encryption of the code-word boundaries information data without the non-prefix free code words stream;
   decryption of the encrypted code-words boundary information data without the non-prefix free code words stream;
   decoding the non-prefix free coding of the code-words stream according to the decrypted code-word boundary information data; and
   generating the input data by decompressing the extracted compressed input data.

2. An encryption method, comprising taking input data where a distribution of symbols in the input data is identically and independently distributed, wherein the method further comprises the following steps:
   encoding with non-prefix free encoding operation of independent and identically distributed input data;
   splitting the encoded independent and identically distributed input data into two streams as code-word boundaries information data which has all information of boundaries of non-prefix free code words stream, and non-prefix free code words stream which has all payload of the encoded independent and identically distributed input data except the code-word boundaries information;
   encryption of the code-word boundaries information data without the non prefix free code words stream;
   decryption of the encrypted code-words boundary information data;
   decoding the non-prefix free coding of the code-words stream according to the decrypted code-word boundary information data; and
   generating the independent and identically distributed input data.

* * * * *